(12) United States Patent
Evans et al.

(10) Patent No.: US 10,259,938 B2
(45) Date of Patent: Apr. 16, 2019

(54) DEVICE WITH PROTECTIVE COVER

(71) Applicant: SABIC GLOBAL TECHNOLOGIES B.V., Bergen op Zoom (NL)

(72) Inventors: Thomas L. Evans, Mount Vernon, IN (US); Jon Michael Malinoski, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1014 days.

(21) Appl. No.: 14/196,967

(22) Filed: Mar. 4, 2014

(65) Prior Publication Data
US 2014/0248483 A1   Sep. 4, 2014

Related U.S. Application Data

(60) Provisional application No. 61/772,448, filed on Mar. 4, 2013.

(51) Int. Cl.
| | |
|---|---|
| C08L 53/00 | (2006.01) |
| C08L 33/06 | (2006.01) |
| C08L 63/00 | (2006.01) |
| C08L 69/00 | (2006.01) |
| G06F 1/16 | (2006.01) |
| C08K 5/526 | (2006.01) |

(52) U.S. Cl.
CPC .............. *C08L 53/00* (2013.01); *C08K 5/526* (2013.01); *C08L 33/068* (2013.01); *C08L 63/00* (2013.01); *C08L 69/005* (2013.01)

(58) Field of Classification Search
CPC ....... Y10T 428/2495; Y10T 428/24967; C08L 53/00; C08L 69/005; C08L 69/00; G06F 1/1633; G06F 3/041; G06F 1/16
USPC ................................. 428/220, 412
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,848,025 B2 | 12/2010 | Hatano et al. | |
| 8,171,432 B2 | 5/2012 | Matas et al. | |
| 2006/0142527 A1 | 6/2006 | Glasgow et al. | |
| 2009/0186966 A1 | 7/2009 | Gallucci et al. | |
| 2010/0129649 A1* | 5/2010 | Malinoski ............. | C08L 69/005 428/339 |
| 2011/0071261 A1* | 3/2011 | Hoeks ................... | C08G 63/64 525/418 |
| 2011/0242039 A1* | 10/2011 | Kalis .................... | G06F 1/1643 345/174 |

FOREIGN PATENT DOCUMENTS

| | | |
|---|---|---|
| EP | 1973028 | 9/2008 |
| WO | 03/066704 | 8/2003 |
| WO | 2013/020004 | 2/2013 |

OTHER PUBLICATIONS

International Search Report and Written Opinion for Application No. PCT/US2014/020269 dated Aug. 8, 2014 (9 pages).
First Office Action from the State Intellectual Property of China for Application No. 201480011609.7 dated Apr. 6, 2016 (9 pages).
European Examination Report for Application No. 14716655.7 dated Apr. 20, 2017 (3 pages).

* cited by examiner

*Primary Examiner* — Joanna Pleszczynska
(74) *Attorney, Agent, or Firm* — Cantor Colburn LLP

(57) ABSTRACT

Provided herein are high flow and ductile thermoplastic resin compositions for the formation of thin wall articles and articles with desirable impact strengths. These compositions are useful in the manufacture of various shaped, formed and/or molded articles.

29 Claims, No Drawings

DEVICE WITH PROTECTIVE COVER

CROSS-REFERENCE TO RELATED APPLICATIONS

This claims priority to U.S. Patent Application No. 61/772,448, filed on Mar. 4, 2013, the entire contents of which are fully incorporated herein by reference.

FIELD OF THE INVENTION

The present invention relates to the development and use of a high flow and ductile thermoplastic resin for the formation of thin wall articles and articles with desirable impact strengths.

BACKGROUND

The commercial success of various portable electronic devices has created a demand for aftermarket protective housings, which provide some impact protection. Of particular interest are thin wall protective housings that would enable the touch pad/screen function of certain electronic devices to appropriately function behind or under the thin housing.

Injection molded cases are currently made from thermoplastic elastomeric (TPE) material such as rubber or silicone, a solid thermoplastic such as polycarbonate (PC)/acrylonitrile-butadiene-styrene (ABS), or a multi-shot combination of the two materials. However, TPE and PC/ABS materials do not meet the clear and low color requirements currently desired by the market because of their inherent opacity. Further, clear thermoplastics, such as acrylic, polystyrene, or clear ABS do not meet the impact/ductility requirement for these applications, which is 100% ductility at room temperature.

Based on the present day demand for clear, low color protective housings that have high impact properties and are thin walled, extremely high flow polycarbonate copolymer based materials are desired. These materials should provide high optical light transmission and clarity, low color, and 100% ductility at room temperature.

SUMMARY OF THE INVENTION

The present invention is directed to articles comprising a thermoplastic composition comprising (a) a poly(aliphatic ester)-polycarbonate copolymer comprising soft block ester units and carbonate units; (b) a heat stabilizer; and (c) an epoxy resin, wherein the thermoplastic composition has a melt flow rate ranging from 40 g/10 minutes to 150 g/10 minutes.

In one aspect, the article is part of an electronic device. The article may be a touch screen or part of a touch screen of an electronic device, a housing or part of a housing of an electronic device, or any other component of an electronic device. The article may comprise multiple parts of an electronic device, whether integrally formed or manufactured as separate components.

In certain embodiments, the article is a touch screen display of an electronic device. The touch screen display may be a sheet molded from the thermoplastic composition. The touch screen display may be 0.5 mm thick or less, 0.3 mm thick or less, or 0.25 mm thick or less. The touch screen display may have a light transmission of 89% and less than 1% haze at 3.2 mm thickness according to ASTM D 1003. The touch screen display may have a surface area of at least 100 mm$^2$. The touch screen display may be for a hand-held device such as a smartphone, a personal digital assistant, a tablet computer, a hand-held video game device, or the like. The touch screen display may comprise a circuit board comprising touch sensors and illuminating elements to illuminate function icons on the touch screen display, the touch sensors and illuminating elements being respectively mounted at positions on the circuit board corresponding to the plurality of function icons.

In certain embodiments, the article is a cover of a touch screen display of an electronic device. Specifically, the touch screen display may comprise a cover including a plurality of function icons, a cover frame to support the cover, the cover frame including a plurality of light guide hollows having a funnel shape in which a diameter of each of the light guide hollows increases away from the illuminating elements, and a board, which is engaged with the cover frame and includes touch sensors and luminous elements to illuminate the function icons mounted thereon. The touch sensors and luminous elements may be respectively mounted at positions on the board corresponding to the plurality of function icons.

The cover may be a sheet molded from the thermoplastic composition of the present invention. The cover may be 0.5 mm thick or less, 0.3 mm thick or less, or 0.25 mm thick or less. The cover may have a light transmission of 89% and less than 1% haze at 3.2 mm thickness according to ASTM D 1003. The cover may have a surface area of at least 100 mm$^2$. The cover may be for a hand-held device such as a smartphone, a personal digital assistant, a tablet computer, a hand-held video game device, or the like.

In another aspect, the article is a protective housing for an electronic device. The protective housing may be configured to protect the front, back, and/or one or more sides of the electronics device. Preferably, at least some portion of the protective housing has a thin wall (e.g., 0.5 mm thick or less, 0.3 mm thick or less, or 0.25 mm thick or less). The protective housing may be integrally formed with the electronic device, or may be fixedly attached to the electronic device. Alternatively, the protective housing may be a snap-on or add-on element to protect the back, front, and/or one or more sides of the electronic device, wherein the protective housing is detachable from the device.

In certain embodiments, the protective housing includes at least one wall that is 0.5 mm thick or less, 0.3 mm thick or less, or 0.25 mm thick or less. The protective housing may have a light transmission of 89% and less than 1% haze at 3.2 mm thickness according to ASTM D 1003. The protective housing may have a surface area of at least 100 mm$^2$. The protective housing may be for a hand-held device such as a smartphone, a personal digital assistant, a tablet computer, a hand-held video game device, or the like. The protective housing may fit a device having the dimensions 114 mm length×66 mm width×8 mm depth. The protective housing may be 114 mm length×66 mm width×8 mm depth. The protective housing may include a protective cover for a touch screen display of an electronic device. The protective cover may be 0.5 mm thick or less, 0.3 mm thick or less, or 0.25 mm thick or less, such that the protective cover may transmit energy to the touch screen so as to allow full functionality of the touch screen.

An ASTM part molded from the thermoplastic composition may exhibit 100% ductility at 23° C.

The thermoplastic composition may exhibit a melt flow rate below 150 g/10 minutes at 300° C. under a load of 1.2 kg according to ASTM D 1238. The thermoplastic composition may exhibit a melt flow rate of 100 g/10 minutes at 300° C. under a load of 1.2 kg according to ASTM D 1238.

The thermoplastic composition may exhibit a melt flow rate of 40 g/10 min at 300° C. under a load of 1.2 kg according to ASTM D 1238. The thermoplastic composition may exhibit a melt flow rate of 55 g/10 min at 300° C. under a load of 1.2 kg according to ASTM D 1238.

The thermoplastic composition may comprise a low molecular weight bisphenol-A polycarbonate having a molecular weight of 17,000 g/mol, as measured by gel permeation chromatography (GPC) using bisphenol-A polycarbonate standards.

The thermoplastic composition may include soft block ester units derived from an alpha, omega $C_{6-20}$ aliphatic dicarboxylic acid or a derivative thereof. The alpha, omega $C_{6-20}$ aliphatic dicarboxylic acid may be an alpha, omega $C_{10}$ dicarboxylic acid. The $C_{10}$ dicarboxylic acid may be sebacic acid. The poly(aliphatic ester)-polycarbonate copolymer comprising soft block ester units and carbonate units may have the following formula:

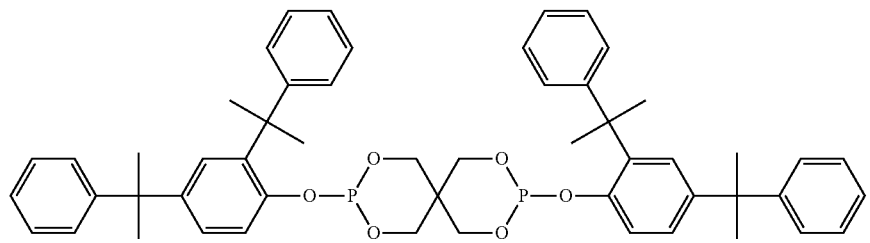

The poly(aliphatic ester)-polycarbonate copolymer may contain 6.0 mol % sebacic acid.

The heat stabilizer of the thermoplastic composition may be:

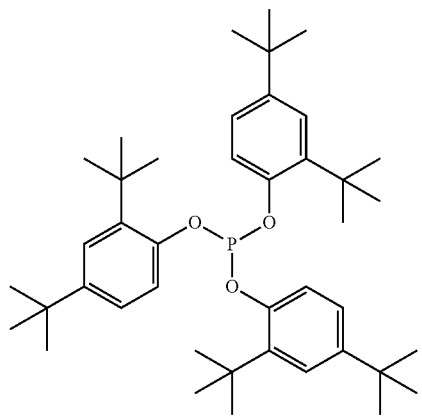 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

tris(2,4-di-t-butylphenyl)phosphite;

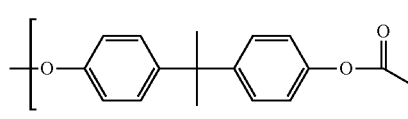

bis(2,4-dicumylphenyl)pentaerythritol diphosphite; or a combination thereof.

The epoxy resin of the thermoplastic composition may be a hydrolytic stabilizer. The epoxy resin may have multiple epoxy groups. The epoxy resin may be Joncryl ADR-4368CS.

The thermoplastic composition may comprise a mold release agent. The mold release agent may be pentaerythritol tetrastearate (PETS), a phthalic acid ester, or a poly-alpha-olefin.

A 3.2 mm thick plaque molded from the thermoplastic composition, molded at 550° F. melt temperature and 10 minutes dwell time, may exhibit a Yellowing Index (YI) value of less than 2.00.

A 3.2 mm thick plaque molded from the thermoplastic composition, molded at 550° F. melt temperature and 10 minutes dwell time, may exhibit a Yellowing Index (YI) percent increase of 6% or less compared to a 3.2 mm thick plaque molded from the thermoplastic composition at 550° F. melt temperature and 30 seconds dwell time.

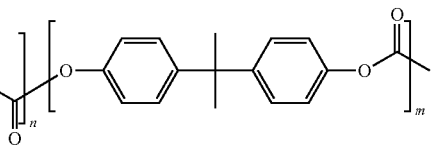

A 3.2 mm thick plaque molded from the thermoplastic composition may exhibit a 96% or greater molecular weight retention after exposure to 85° C. at 85% relative humidity (RH) after 4 weeks.

The thermoplastic composition may be produced by a process comprising use of a redistribution catalyst that is 45% tetra-n-butyl phosphonium hydroxide solution in water.

DETAILED DESCRIPTION

The herein described thermoplastic compositions exhibit high melt flow and room temperature ductility characteristics, which make these compositions suitable for use in a variety of thin-wall applications where, for example, low color and high transparency are desired. The inventor has discovered that a low molecular weight poly(aliphatic ester)-polycarbonate copolymer comprising soft block ester units and carbonate units, mixed with a heat stabilizer and epoxy resin, can be extruded and molded into thin-wall articles, such as electronics touch screens, and/or protective housings for electronics devices.

1. Definitions

The terminology used herein is for the purpose of describing particular embodiments only and is not intended to be limiting. As used in the specification and the appended claims, the singular forms "a," "an" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Copolymer" as used herein may mean a polymer derived from two or more structural unit or monomeric species, as opposed to a homopolymer, which is derived from only one structural unit or monomer.

"$C_3$-$C_6$ cycloalkyl" as used herein may mean cyclopropyl, cyclobutyl, cyclopentyl, and cyclohexyl.

"Halogen" or "halogen atom" as used herein may mean a fluorine, chlorine, bromine, or iodine atom.

"Heteroaryl" as used herein may mean any aromatic heterocyclic ring which may comprise an optionally benzo-condensed 5 or 6 membered heterocycle with from 1 to 3 heteroatoms selected among N, O, or S, Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"PETS release agent" as used herein may mean pentaerythritol tetrastearate, mold release agent.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy, and isopropoxy.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

The term "cover", "touch screen cover", or "pad cover" as used herein may refer to a part of a touch screen. The cover may include a plurality of function icons. The cover may be a cover as described in EP 1973 028, which is hereby incorporated by reference. The cover may be manufactured from, or may comprise a thermoplastic composition, as described herein. The term "cover" is to be distinguished from the term "protective cover", which may be part of a "protective housing", as defined herein.

The term "protective housing" or "phone cover" as used herein may refer to an article configured to protect the front (e.g., a touch screen), back, and/or one or more sides of an electronics device. The protective housing may be manufactured from, or may comprise a thermoplastic composition, as described herein. At least some portion of the protective housing may have a thin wall (e.g., 0.5 mm thick or less, 0.3 mm thick or less, or 0.25 mm thick or less). The protective housing may be integrally formed with an electronic device, or may be fixedly attached to an electronic device. Alternatively, the protective housing may be a snap-on or add-on element to protect the front, back, and/or one or more sides of an electronic device, wherein the protective housing is detachable from the device. The protective housing may include or may be a "protective cover" for a touch screen display of an electronic device.

The term "protective cover" as used herein may refer to an article configured to protect a touch screen of an electronic device. The protective cover may be placed over a touch screen to protect the screen against scratching, marring or breakage. The protective cover may be 0.5 mm thick or less, 0.3 mm thick or less, or 0.25 mm thick or less, such that the protective cover, upon being touched, may transmit energy to the touch screen so as to allow full functionality of the touch screen.

For the recitation of numeric ranges herein, each intervening number there between with the same degree of precision is explicitly contemplated. For example, for the range of 6-9, the numbers 7 and 8 are explicitly contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Thermoplastic Composition

The herein described thermoplastic composition comprises a low molecular weight and high flow poly(aliphatic ester)-polycarbonate copolymer comprising soft block ester units and carbonate units, a heat stabilizer, and an epoxy resin.

The thermoplastic composition exhibits high melt flow characteristics. For example, the thermoplastic composition may have a melt flow rate (MFR) of from 40 to 125 g/10 minutes at 300° C. and 1.2 kilogram-force (kgf), from 60 to 120 g/10 minutes at 300° C. and 1.2 kgf, from 70 to 110 g/10 minutes at 300° C. and 1.2 kgf, from 80 to 100 g/10 minutes at 300° C. and 1.2 kgf, or from 90 to 110 g/10 minutes at 300° C. and 1.2 kgf. The thermoplastic composition may have a melt flow rate of 100 g/10 minutes at 300° C. and 1.2 kgf. The thermoplastic composition may have a melt flow rate of 40 g/10 minutes at 300° C. and 1.2 kgf, 55 g/10 minutes at 300° C. and 1.2 kgf, or 65 g/10 minutes at 300° C. and 1.2 kgf. The MFR may be measured according to ASTM D1238.

a. Low Molecular Weight and High Flow Poly(Aliphatic Ester)-Polycarbonate Copolymer The thermoplastic composition from which the articles herein are molded includes a poly(aliphatic ester)-polycarbonate. Generally, as used herein, the term or suffix "polycarbonate" means compositions having repeating structural carbonate units of the formula (1):

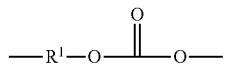

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

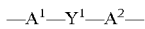

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—R¹—OH, which includes dihydroxy compounds of formula (3):

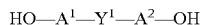

wherein Y¹, A¹ and A² are as described above. Also included are bisphenol compounds of general formula (4):

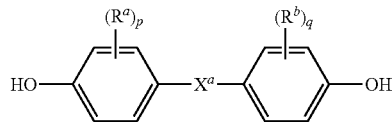

wherein $R^a$ and $R^b$ each represent a halogen atom or a monovalent hydrocarbon group and may be the same or different; p and q are each independently integers of 0 to 4; and $X^a$ represents one of the groups of formula (5):

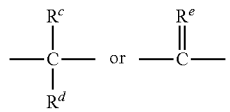

wherein $R^c$ and $R^d$ each independently represent a hydrogen atom or a monovalent linear or cyclic hydrocarbon group, and $R^e$ is a divalent hydrocarbon group.

In one embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or a fused polycyclic ring system wherein the fused rings are independently saturated, unsaturated, or aromatic.

Other bisphenols containing substituted or unsubstituted cyclohexane units can be used, for example bisphenols of formula (6):

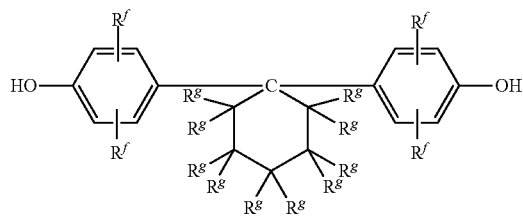

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—R¹—OH include aromatic dihydroxy compounds of formula (7):

wherein n is 0 to 4 and each $R^h$ is independently a halogen atom, a $C_{1-10}$ hydrocarbyl such as a $C_{1-10}$ alkyl group, or a halogen substituted $C_{1-10}$ hydrocarbyl such as a halogen-substituted $C_{1-10}$ alkyl group. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like, catechol, hydroquinone, substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6- tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In addition to the polycarbonates described above, combinations of the polycarbonate with other thermoplastic polymers, for example combinations of homopolycarbonates and/or polycarbonate copolymers, may be used.

In a specific embodiment, where a polycarbonate is included, the polycarbonate may be a linear homopolymer derived from bisphenol A, in which each of $A^1$ and $A^2$ is p-phenylene and $Y^1$ is isopropylidene. The polycarbonates generally may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, a polycarbonate may have a melt volume flow rate (often abbreviated MVR) measured as the rate of extrusion of a thermoplastic through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, where a polycarbonate is used in addition to the poly(aliphatic ester)-polycarbonate, the polycarbonate (or a combination of polycarbonates) has an MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

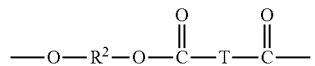

wherein $R^2$ is a divalent group derived from a dihydroxy compound, and may be, for example, a $C_{2-10}$ alkylene group, a $C_{6-20}$ alicyclic group, a $C_{6-20}$ aromatic group, or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and may be, for example, a $C_{4-18}$ aliphatic group, a $C_{6-20}$ alkylene group, a $C_{6-20}$ alicyclic group, a $C_{6-20}$ alkyl aromatic group, or a $C_{6-20}$ aromatic group.

$R^2$ may be a $C_{2-30}$ alkylene group having a straight chain, branched chain, or cyclic (including polycyclic) structure. Alternatively, $R^2$ may be derived from an aromatic dihydroxy compound of formula (4) above, or from an aromatic dihydroxy compound of formula (7) above.

Examples of aromatic dicarboxylic acids that may be used to prepare the polyester units include isophthalic, terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or a combination thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

The thermoplastic composition comprises a polyester-polycarbonate copolymer, and specifically a polyester-polycarbonate copolymer in which ester units comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and may be unbranched straight chain or branched chain dicarboxylic acids, cycloalkyl or cycloalkylidene-containing dicarboxylic acids units, or combinations of these structural units. The $C_{6-20}$ aliphatic dicarboxylic acid ester unit may include a straight chain alkylene group comprising methylene ($-CH_2-$) repeating units. In a specific embodiment, a useful soft block ester unit comprises units of formula (8a):

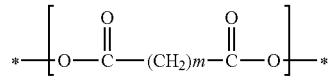

where m is 4 to 18. In a specific embodiment of formula (8a), m is 8 to 10. The poly(aliphatic ester)-polycarbonate can include less than or equal to 25 wt % of the soft block unit. In an embodiment, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate may be a copolymer of soft block ester units and carbonate units. The poly(aliphatic ester)-polycarbonate is shown in formula (8b):

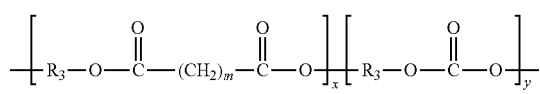

where each $R_3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a specific embodiment, the soft block ester units can be derived from an alpha, omega $C_{10-12}$ aliphatic dicarboxylic acid or a reactive derivative thereof. In another specific embodiment, the carboxylate portion of the aliphatic ester unit of formula (8a), in which the terminal carboxylate groups are connected by a chain of repeating methylene (—$CH_2$—) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides may be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths may be used. A specific embodiment of the poly(aliphatic ester)-polycarbonate having soft block ester units comprising a straight chain methylene group and a bisphenol A polycarbonate group is shown in formula (8c):

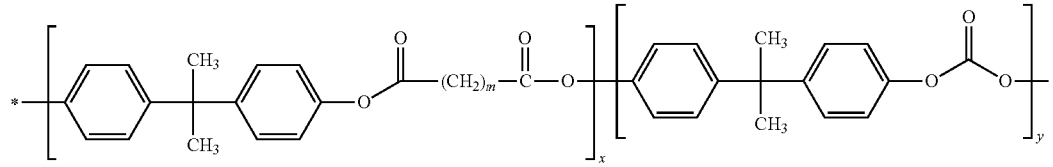

where m is 4 to 18 and x and y are as defined for formula (8b). In a specific exemplary embodiment, a useful poly(aliphatic ester)-polycarbonate copolymer comprises sebacic acid ester units and bisphenol A carbonate units (formula (8c), where m is 8, and the average weight ratio of x:y is 6:94).

A sebacic acid containing polyester-polycarbonate copolymer may have the following formula (8d):

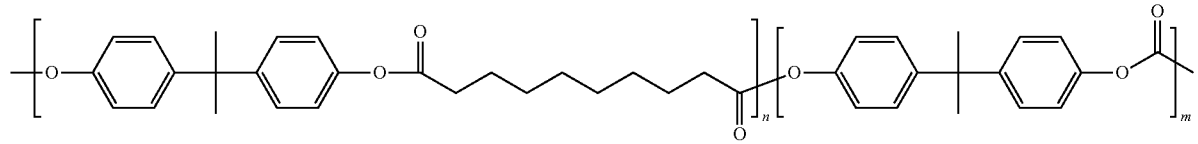

wherein n may be from 1 to 6, and m may be from 25 to 60. For example, n may be 2, 2.1, 2.2, 2.3, 2.4, 2.5, 2.6, 2.7, 2.8, 2.9, or 3. For example, m may be 30, 31, 32, 33, 34, 35, 36, 37, 38, 39, 40, 41, 42, 43, 44, 45, 46, 47, 48, 49, 50, 51, 51.1, 51.2, 51.3, 51.4, 51.5, 51.6, 51.7, 51.8, 51.9, or 60.

The poly(aliphatic ester)-polycarbonate copolymer may have from 4.0 mole % to 12.0 mole % of sebacic acid (of the total composition). The poly(aliphatic ester)-polycarbonate copolymer may have from 5.0 mole % to 11.0 mole %, from 6.0 mole % to 10.0 mole %, from 7.0 mole % to 9.0 mole %, from 5.0 mole % to 7.0 mole %, or from 5.5 mole % to 6.5 mole % of sebacic acid (of the total composition). The poly(aliphatic ester)-polycarbonate copolymer may have 6.0 mole % of sebacic acid (of the total composition).

The poly(aliphatic ester)-polycarbonate copolymer may have a weight average molecular weight (Mw) of 1,500 to 100,000 g/mol [$\pm$1,000 g/mol], from 1,700 to 50,000 g/mol [$\pm$1,000 g/mol], from 15,000 to 45,000 g/mol [$\pm$1,000 g/mol], from 17,000 to 40,000 g/mol [$\pm$1,000 g/mol], from 20,000 to 30,000 g/mol [$\pm$1,000 g/mol], or from 20,000 to 25,000 g/mol [$\pm$1,000 g/mol]. The poly(aliphatic ester)-polycarbonate may have a weight average molecular weight of 21,500 [$\pm$1,000 g/mol]. The poly(aliphatic ester)-polycarbonate may have a weight average molecular weight of 17,000 [$\pm$1,000 g/mol]. Molecular weight determinations may be performed using gel permeation chromatography (GPC), using a crosslinked styrene-divinylbenzene column and calibrated to polycarbonate references. Samples may be prepared at a concentration of about 1 mg/ml, and eluted at a flow rate of about 1.0 ml/min.

The poly(aliphatic ester)-polycarbonate may have a biocontent from 2 weight % to 90 weight %, from 5 weight % to 25 weight %; from 10 weight % to 30 weight %; from 15 weight % to 35 weight %; from 20 weight % to 40 weight %; from 25 weight % to 45 weight %; from 30 weight % to 50 weight %; from 35 weight % to 55 weight %; from 40 weight % to 60 weight %; from 45 weight % to 65 weight %; from 55 weight % to 70% weight %; from 60 weight % to 75 weight %; from 50 weight % to 80 weight %; or from 50 weight % to 90 weight %. The biocontent may be measured according to ASTM D6866.

The thermoplastic composition may have a viscosity build of less than 15%, less than 10%, less than 5%, less than 1%, or less than 0.5%.

Melt viscosity may be measured using a rheometric method. For example, melt viscosity values for a resin may be obtained on a rheometer. The percent viscosity change after a certain length of time may be determined from a relationship of the melt viscosity change as a function of time during a rheometric test. For example, the percentage viscosity change (% Viscosity) may be determined by applying the following equation:

$$\% \text{ Viscosity} = (V_{7\ minutes} - V_{initial})/V_{initial} \times 100$$

wherein, for example, $V_{7\ minutes}$ is the melt viscosity measured at 300° C. after 7 minutes, $V_{initial}$ is the initial melt viscosity at 300° C. reported by the rheometer. 7 minutes is only an example of the length of time over which the percent viscosity change may be measured.

b. Heat Stabilizer

The thermoplastic composition may contain one or more heat stabilizers. The one or more heat stabilizers may be selected from:

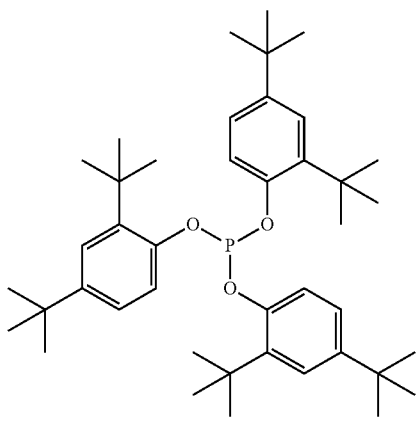

(9)

tris(2,4-di-t-butylphenyl)phosphite (also known as IRGA-PHOS®168),

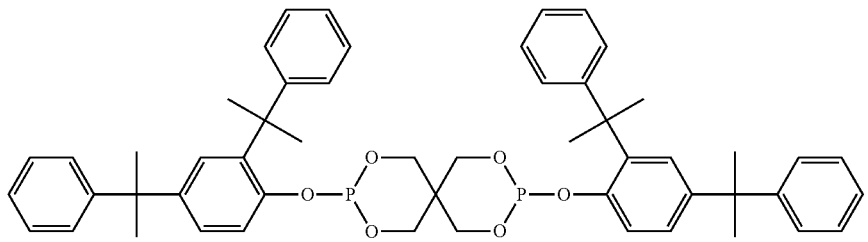

(10)

bis(2,4-dicumylphenyl)pentaerythritol diphosphite (also known as DOVERPHOS® S-9228), and a hindered phenol heat stabilizer such as:

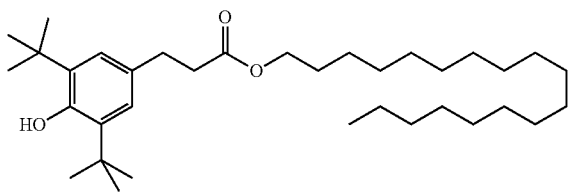

(11)

octadecyl-3(3,5-ditertbutyl-4-hydroxyphenyl)propionate (also known as IRGANOX® 1076.

The one or more heat stabilizers may be used in amounts of 0.00001 to 1 part by weight, based on 100 parts by weight of the polymer component of the thermoplastic composition. The polycarbonate resin composition may contain from 0.001 weight (wt) % to 0.003 wt %, from 0.003 wt % to 0.006 wt %, from 0.01 wt % to 0.03 wt %, from 0.02 wt % to 0.03 wt %, from 0.025 wt % to 0.03 wt %, from 0.02 wt % to 0.04 wt %, from 0.04 wt % to 0.06 wt %, from 0.06 wt % to 0.08 wt %, from 0.08 wt % to 0.1 wt %, from 0.1 wt % to 0.3 wt %, from 0.3 wt % to 0.5 wt %, from 0.5 wt % to 0.7 wt %, from 0.7 wt % to 0.9 wt %, from 0.9 wt % to 1.1 wt %, from 1.1 wt % to 1.3 wt %, from 1.3 wt % to 1.5 wt %, or from 1.5 wt % to 2.0 wt % of each heat stabilizer. Any combination of heat stabilizer may be incorporated into the resin. Two or more heat stabilizers incorporated into the resin may have different wt percents. The weight ratio of one heat stabilizer to another heat stabilizer in the resin composition may be 5:95, 10:90, 20:80, 30:70, 40:60, or 50:50. The weight ratio of three heat stabilizers in the thermoplastic composition may be 5:10:85, 33.3:33.3:33.3, 10:20:70, 20:20:60, 30:30:40, 40:40:20, or 10:10:80. The one or more heat stabilizers may be added to the polymerization reaction and/or to the branched polycarbonate prior to extrusion. The polymerization reaction may include one or more structural units in the presence of one or more branching agents.

c. Epoxy Resin

The thermoplastic composition comprises an epoxy resin. The epoxy resin may be polymeric or non-polymeric. It may be used as a hydrolytic stabilizer to improve the hydrolytic stability of the overall composition. This may be a critical factor for portable electronic devices, such as smartphones, personal digital assistants, tablet computers, hand-held video game devices, or the like, as they are sensitive to hydrothermal degradation because of their relatively large and exposed surface areas; especially as compared to lenses encountered in cameras and cell phones, for example. The epoxy resin may be multifunctional, meaning the epoxy has at least one or at least two epoxy groups present in each molecule of the epoxy compound. Other functional groups may also be present, provided that such groups do not substantially adversely affect the desired properties of the composition.

The epoxy compound may contain aromatic and/or aliphatic residues, as well as non-epoxy functional groups. The epoxy compound may be a polymeric compound comprising at least two epoxy groups, wherein the polymeric compound has a Mw of 1,000 to 18,000. Exemplary polymers (which as used herein includes oligomers) having multiple epoxy groups include the reaction products of an epoxy-containing ethylenically unsaturated monomer (e.g., a glycidyl($C_{1-4}$ alkyl)(meth)acrylate, allyl glycidyl ethacrylate, and glycidyl itoconate) with one or more non-epoxy functional ethylenically unsaturated compounds (e.g., styrene, ethylene, methyl (meth)acrylate, n-butyl acrylate, and the like). Specifically, the epoxy polymer may be the reaction product of an epoxy-functional (meth)acrylate monomer with a non-epoxy functional styrenic and/or ($C_{1-8}$ hydrocarbyl)(meth)acrylate and/or olefin monomer.

The epoxy resin may have the formula (12):

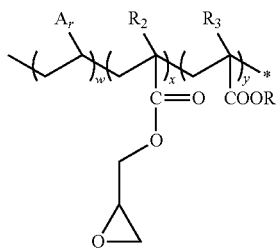

wherein Ar is $C_6$ to $C_{24}$ aryl, specifically phenyl or tolyl, R is $C_1$ to $C_{1-2}$ alkyl, specifically methyl, ethyl, or butyl, $R_2$ and $R_3$ are each independently H or $C_1$ to $C_{1-2}$ alkyl, specifically methyl, ethyl, or butyl, w and y are each 0 to 98, and x is 2 to 100, and the sum of x, y, and z is 100.

The epoxy polymer may be a copolymeric reaction product of a glycidyl(meth)acrylate monomer, ethylene, and optionally a $C_{1-4}$(alkyl)(meth)acrylate monomer. Useful commercially available terpolymers of this type include the ethylene-methyl acrylate-glycidyl methacrylate terpolymers sold under the trade name LOTADER by Atofina.

The epoxy polymer may be the reaction product of an epoxy-functional (meth)acrylate monomer, a non-epoxy functional styrenic monomer, and optionally a non-epoxy functional $C_{1-8}$(hydrocarbyl)(meth)acrylate monomer.

Examples of specific epoxy-functional (meth)acrylate monomers may include those containing 1,2-epoxy groups such as glycidyl acrylate and glycidyl methacrylate. Exemplary styrenic monomers may include styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene. Exemplary $C_{1-8}$(hydrocarbyl)(meth)acrylate monomers include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Specific optional monomers are $C_{1-4}$(alkyl)(meth)acrylate monomers. Combinations comprising at least one of the foregoing monomers may be used.

Several useful examples of styrene-(meth)acrylate copolymers containing glycidyl groups incorporated as side chains are described in the International Patent Application WO 03/066704 A1, assigned to Johnson Polymer, LLC (now BASF), which is incorporated herein by reference in its entirety. A high number of epoxy groups per mole is useful, for example, 10 to 500, specifically 100 to 400, or more specifically 250 to 350. These polymeric materials have a weight average molecular weight of 1,500 to 18,000, specifically 3,000 to 13,000, or more specifically 4,000 to 8,500 Daltons. Epoxy-functional styrene-(meth)acrylate copolymers with glycidyl groups are commercially available from Johnson Polymer, LLC (now BASF) under the Joncryl® trade name, for example the Joncryl ADR-4368CS material.

The epoxy resin may be Joncryl ADR-4368CS.

The epoxy resin may be a monomeric or polymeric compound having two terminal epoxy functionalities, and optionally or other functionalities. The expoxy can further contain only carbon, hydrogen, and oxygen. Difunctional epoxy compounds, in particular those containing only carbon, hydrogen, and oxygen can have a molecular weight of below 1000 g/mol. Difunctional epoxy compounds may have at least one of the epoxide groups on a cyclohexane ring. Exemplary difunctional epoxy compounds may be 3,4-epoxycyclohexyl-3,4-epoxycyclohexyl carboxylate, bis (3,4-epoxycyclohexylmethyl)adipate, vinylcyclohexene diepoxide, bisphenol diglycidyl ethers such as bisphenol A diglycidyl ether (available from Dow Chemical Company under the trade names DER 332, DER 661, and DER 667, or from Hexion under the trade names EPON 826, EPON 828, EPON 1001F, EPON 1004F, EPON 1005F, EPON 1007F, and EPON 1009F), tetrabromobisphenol A diglycidyl ether, glycidol, diglycidyl adducts of amines and amides, diglycidyl adducts of carboxylic acids such as the diglycidyl ester of phthalic acid and the diglycidyl ester of hexahydrophthalic acid (available from Ciba Products under the trade name Araldite CY 182), bis(3,4-epoxy-6-methyl-cyclohexylmethyl)adipate, butadiene diepoxide, vinylcyclohexene diepoxide, dicyclopentadiene diepoxide, cycloaliphatic epoxy resins commercially available from Dow under the trade names ERL-4221 and ERL-4299, and the like. 3,4-epoxycyclohexyl-3,4 epoxycyclohexylcarboxylate is commercially available from Union Carbide Corporation.

The epoxy resin may be added to the composition in an amount effective to aid in the retention of transparency, dimensional integrity, and/or impact strength of the composition after hydrothermal aging. The epoxy resin may be added to the blend polymer composition in an amount effective to retain the transparency of the composition after hydrothermal treatment. The epoxy resin may be added to the blend polymer composition in an amount effective to improve the retention of impact strength of the composition after hydrothermal aging. The epoxy resin may be added to the blend polymer composition in an amount effective to improve the retention of dimensional integrity of the composition after hydrothermal aging.

The epoxy resin may be added in an amount effective to maintain or improve the gloss of the overall blend polymer composition. The amount of the epoxy resin may be 0.01 to 10 wt. %, 0.01 to 5 wt. %, or 0.1 to 3 wt. %, based on the total weight of the polymer component of the composition.

3. Other Additives a. Impact Modifiers

The resin composition may further comprise impact modifiers. For example, the composition can further include impact modifier(s), with the proviso that the impact modifiers are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or from about −40° C. to about −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl (meth)acrylates; elastomeric copolymers of $C_1$-$C_8$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

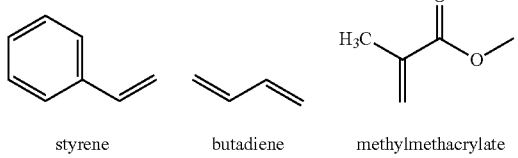

styrene    butadiene    methylmethacrylate

SEBS may be a linear triblockcopolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of the polymer component of the thermoplastic composition. Impact modifiers may include MBS and SBS.

b. Flame Retardant

The polycarbonate resin may further comprise one or more flame retardants. The one or more flame retardants may be flame retardant salts. The one or more flame retardant salts may include, for example, such as alkali metal salts of perfluorinated $C_1$-$C_{16}$ alkyl sulfonates such as potassium perfluorobutane sulfonate (Rimar salt), potassium perfluorooctane sulfonate, tetraethylammonium perfluorohexane sulfonate, potassium diphenylsulfone sulfonate (KSS), sodium toluenesulfonate (NaTS), sodium diphenylsulfone sulfonate (NaSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Alkali metal salts of perfluorinated $C_1$-$C_{16}$ alkyl sulfonates, KSS and NaTS, alone or in combination with other flame retardants, are particularly useful in the polycarbonate compositions disclosed herein.

In another embodiment, the flame-retardants are selected from at least one of the following: alkali metal salts of perfluorinated $C_1$-$C_{16}$ alkyl sulfonates; potassium perfluorobutane sulfonate (Rimar Salt); potassium perfluorooctane sulfonate; tetraethylammonium perfluorohexane sulfonate; and potassium diphenylsulfone sulfonate.

In another embodiment, other flame retardants such as organic compounds that include phosphorus, bromine, and/or chlorine can also be present in combination with the flame retardant salts. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

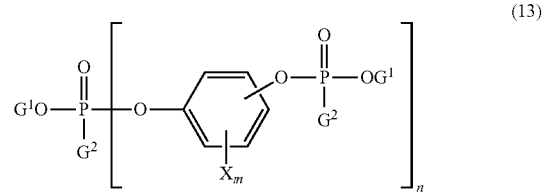

(13)

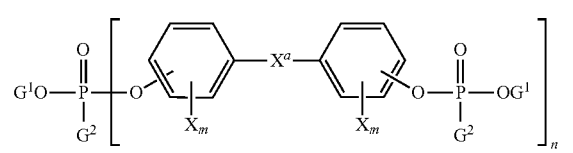

(14)

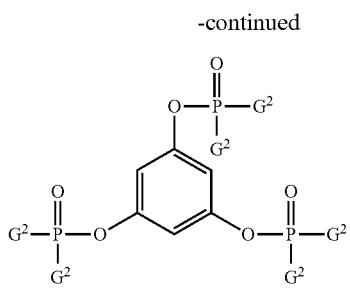

(15)

wherein each $G^1$ is independently a hydrocarbon having 1 to 30 carbon atoms; each $G^2$ is independently a hydrocarbon or hydrocarbonoxy having 1 to 30 carbon atoms; each $X^a$ represents one of the groups of formula (5) above; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively (BPADP), their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, and tris(aziridinyl) phosphine oxide.

Halogenated organic flame retardant compounds can also be used as flame retardants, for example halogenated flame retardant compounds of the following formula:

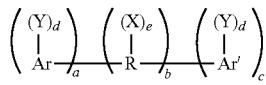

(16)

wherein R is a $C_1$-$C_{36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (16) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, or fluorine, or (2) ether groups of the general formula OB, wherein B is a monovalent hydrocarbon group similar to X, or (3) monovalent hydrocarbon groups of the type represented by R, or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl group such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl, and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt. %, specifically 0.02 to 5 wt. %, and more specifically 0.01 to 1 wt % based on 100 parts by weight of the polymer component of the thermoplastic composition.

c. UV Stabilizers

The composition may further comprise a UV stabilizer for improved performance in UV stabilization. UV stabilizers disperse UV radiation energy by absorbing the energy through reversible chemical rearrangements such as hydrogen shifts.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morphilino-s-triazine-2,4-diyl)[2,2,6, 6-tetramethyl-4-piperidyl)imino]-hexamethylene[(2,2,6,6-tetramethyl-4-piperidyl)imino], 2-hydroxy-4-octloxybenzophenone (Uvinul® 3008), 6-tert-butyl-2-(5-chloro-2H-benzotriazole-2-yl)-4-methylphenol (Uvinul® 3026), 2,4-di-tert-butyl-6-(5-chloro-2H-benzotriazole-2-yl)-phenol (Uvinul® 3027), 2-(2H-benzotriazole-2-yl)-4,6-di-tert-pentylphenol (Uvinul® 3028), 2-(2H-benzotriazole-2-yl)-4-(1, 1,3,3-tetramethylbutyl)-phenol (Uvinul® 3029), 1,3-bis [(2'cyano-3',3'-diphenylacryloyl)oxy]-2,2-bis-{[(2'-cyano-3',3'-diphenylacryloyl)oxy]methyl}-propane (Uvinul® 3030), 2-(2H-benzotriazole-2-yl)-4-methylphenol (Uvinul® 3033), 2-(2H-benzotriazole-2-yl)-4,6-bis(1-methyl-1-phenyethyl)phenol (Uvinul® 3034), ethyl-2-cyano-3,3-diphenylacrylate (Uvinul® 3035), (2-ethylhexyl)-2-cyano-3,3-diphenylacrylate (Uvinul® 3039), N,N'-bisformyl-N,N'-bis(2, 2,6,6-tetramethyl-4-piperidinyl)hexamethylendiamine (Uvinul® 4050H), bis-(2,2,6,6-tetramethyl-4-piperidyl)-sebacate (Uvinul® 4077H), bis-(1,2,2,6,6-pentamethyl-4-piperdiyl)-sebacate+methyl-(1,2,2,6,6-pentamethyl-4-piperidyl)-sebacate (Uvinul® 4092H), or a combination thereof.

The composition may comprise one or more UV stabilizers.

In certain embodiments, the composition may comprise one or more UV stabilizers, excluding Cyasorb 5411, Cyasorb UV-3638, Uvinul 3030, and/or Tinuvin 234.

d. Colorants

Colorants such as pigment and/or dye additives may be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_2$-$C_8$) olefin dyes; carbocyanine dyes; indanthrone dyes; phthalocyanine dyes; oxazine dyes; carbostyryl dyes; naphthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"", 5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

e. Plasticizers, Lubricants, Mold Release Agents

The composition may comprise plasticizers, lubricants, and mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the composition.

4. Method of Making the Thermoplastic Composition

The thermoplastic composition may be made by a reactive extrusion process, an interfacial polymerization process, or melt polymerization.

a. Reactive Extrusion

The thermoplastic composition may be manufactured using a reactive extrusion process. For example, a poly (aliphatic ester)-polycarbonate may be modified to provide a reaction product with a higher flow by treatment using a redistribution catalyst under conditions of reactive extrusion. During reactive extrusion, the redistribution catalyst may be injected into the extruder being fed with the poly (aliphatic ester)-polycarbonate. The redistribution catalyst may be included in the extrusion process in small amounts of less than or equal to 400 parts per million (ppm) by weight, for example. The redistribution catalyst may be present in amounts of from 0.01 to 0.05 parts per hundred (pph), from 0.1 to 0.04 pph, from 0.02 to 0.03 pph, from 0.1 to 1 pph, from 1 to 500 pph, from 100 to 400 pph, from 300 to 400 pph, from 100 to 400 ppm, from 200 to 300 ppm, or from 1 to 300 ppm by weight based on the weight of the poly(aliphatic ester)-polycarbonate.

The redistribution catalyst may be injected as a diluted aqueous solution. For example, the redistribution catalyst may be a 10%, 15%, 20%, 25%, 30%, 35%, 40%, 45%, 50%, 55%, 60%, 65%, 70%, 75%, 80%, 85%, 90%, 95%, or 99% solution. The redistribution catalyst may be diluted in water.

Examples of redistribution catalysts include tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. Particularly useful redistribution catalysts are tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide. The redistribution catalyst may not react with the epoxy.

b. Interfacial Polymerization

The thermoplastic composition may be manufactured using an interfacial phase transfer process. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative may be condensed with the dihydroxyaromatic compound in a first condensation, followed by in situ phosgenation to generate the carbonate linkages with the dihydroxyaromatic compound. Alternatively, the dicarboxylic acid or derivative may be condensed with the dihydroxyaromatic compound simultaneously with phosgenation.

c. Melt Polymerization

The thermoplastic composition may alternatively be manufactured by a melt polymerization process. Generally, in the melt polymerization process, polycarbonates are prepared by co-reacting, in a molten state, the dihydroxy reactant(s) (e.g., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OH), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst consisting essentially of an alkali or alkaline earth salt. In an exemplary aspect, the transesterification catalyst consists essentially of sodium hydroxide, potassium hydroxide, sodium carbonate, potassium carbonate, sodium methoxide, potassium methoxide, NaH$_2$PO$_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

A second transesterification catalyst, also referred to herein as a beta catalyst, can optionally be included in the melt polymerization process, provided that the inclusion of such a second transesterification catalyst does not significantly adversely affect the desirable properties of the poly(aliphatic ester)-polycarbonate copolymer. Exemplary transesterification catalysts can further include a combination of a phase transfer catalyst of formula (R$^3$)$_4$Q$^+$X above, wherein each R$^3$ is the same or different, and is a C$_{1-10}$ alkyl group; Q is a nitrogen or phosphorus atom; and X is a halogen atom or a C$_{1-8}$ alkoxy group or C$_{6-18}$ aryloxy group. Exemplary phase transfer catalyst salts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{1-8}$ alkoxy group or a C$_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, and bis(o-formylphenyl)carbonate.

Non-limiting examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate, and the like. In one aspect, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl, or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate, and bis(o-cyanophenyl)carbonate. Unsymmetrical combinations of these structures can also be used as non-activated carbonates.

An end-capping agent (also referred to as a chain-stopper) may optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C$_1$-C$_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In one aspect, endgroups can derive from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In one aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like.

Where a combination of alpha and beta catalysts are used in the melt polymerization, poly(aliphatic ester)-polycarbonate copolymer prepared from an activated carbonate may comprise endgroups in an amount of less than 2,000 ppm, less than 1,500 ppm, or less than 1,000 ppm, based on the weight of the polycarbonate. In another aspect, where only an alpha catalyst is used in the melt polymerization, a poly(aliphatic ester)-polycarbonate copolymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

The reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture may be accomplished by any method known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there from, relative to the total moles of monomer unit compounds (e.g., isosorbide, aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

The melt polymerization reaction may be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature may be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction may then be increased to about 250° C. and then further increased to a temperature of about 320° C., and all sub-ranges there between. In one aspect, the total reaction time may be from about 30 minutes to about 200 minutes and all sub-ranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

The progress of the reaction may be monitored by measuring the melt viscosity or the weight average molecular weight of the reaction mixture using techniques known in the art such as gel permeation chromatography. These properties may be measured by taking discreet samples or can be measured on-line. After the desired melt viscosity and/or molecular weight is reached, the final polycarbonate product may be isolated from the reactor in a solid or molten form. It will be appreciated by a person skilled in the art, that the method of making aliphatic homopolycarbonate and aliphatic-aromatic copolycarbonates as described in the preceding sections may be made in a batch or a continuous process and the process disclosed herein is essentially preferably carried out in a solvent free mode. Reactors chosen should ideally be self-cleaning and should minimize any "hot spots." However, vented extruders similar to those that are commercially available may be used.

In one aspect, the aliphatic homopolycarbonate and aliphatic-aromatic copolycarbonate may be prepared in an extruder in presence of one or more catalysts, wherein the carbonating agent is an activated aromatic carbonate. In one aspect, the reactants for the polymerization reaction may be fed to the extruder in powder or molten form. In another aspect, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may, in various aspects, be manipulated by controlling, among other factors, the feed rate of the reactants, the type of extruder, the extruder screw design and configuration, the residence time in the extruder, and the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, sidestreams, and sizes. One skilled in the art can find the best designs using generally known principals of commercial extruder design. The most important variable controlling the Mw when using an activated carbonate is the ratio diarylcarbonate/diol, specifically BMSC/diol. A lower ratio will give a higher molecular weight.

In one aspect, decomposition by-products of the reaction that are of low molecular weight can be removed by, for example, devolatilization during reaction and/or extrusion to reduce the amount of such volatile compounds. The volatiles typically removed can include unreacted starting diol materials or carbonate precursor materials, but are more specifically the decomposition products of the melt-polymerization reaction.

(1) Branching Groups

Poly(aliphatic ester)-polycarbonate copolymers with branching groups are also contemplated as being useful, provided that such branching does not significantly adversely affect desired properties of the composition. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

5. Articles

The thermoplastic composition can be molded into useful shaped articles by a variety of means such as injection molding, extrusion, rotational molding, blow molding, and thermoforming to form articles such as, for example, touch pads/screens for electronic devices such as smartphones, personal digital assistants, tablet computers, hand-held video game devices, or the like, various components for cell phones and cell phone covers, components for computer housings, computer housings and business machine housings, such as housing for monitors, handheld electronic device housing such as computer or business machine housings, housings for hand-held devices, components for light fixtures or home appliances, components for medical applications or devices, or components for interior or exterior components of an automobile, and the like. The article may be a thin wall article and/or a protective article as described below. Because the thermoplastic composition is high flow, articles formed from the composition are not limited by shape or size.

The article may have a surface area of at least 100 mm², at least 150 mm², at least 200 mm², at least 250 mm², at least 300 mm², at least 350 mm², at least 400 mm², at least 450 mm², at least 500 mm², at least 550 mm², at least 600 mm², at least 650 mm², at least 700 mm², at least 750 mm², at least 800 mm², at least 850 mm², at least 900 mm², at least 950 mm², at least 1,000 mm², or at least 1,100 mm².

The article may have a surface area of from 100 mm² to 2000 mm², from 150 mm² to 1800 mm², from 200 mm² to 1600 mm², from 250 mm² to 1500 mm², from 300 mm² to 1300 mm², from 350 mm² to 1100 mm², from 400 mm² to 1000 mm², from 450 mm² to 900 mm², or from 500 mm² to 800 mm²

The article may have any dimension. For example, the article may have the dimensions of a portable electronic device, such as a smartphone, a personal digital assistant, a tablet computer, a hand-held video game device, or the like. The article may be from 20 mm to 500 mm in length, from 20 mm to 100 mm in width, and from 3 mm to 12 mm in depth, for example. The article may be 114 mm length×66 mm width×8 mm depth, for example. The article may be a thin sheet for use as a touch screen or pad or touch screen or pad cover, for example.

The article, having a 3.2 mm thickness, may exhibit a light transmission value of at least 50%, at least 55%, at least 60%, at least 65%, at least 70%, at least 75%, at least 80%, at least 81%, at least 82%, at least 83%, at least 84%, at least 85%, at least 86%, at least 87%, at least 88%, at least 89%, at least 90%, at least 95, or at least 99%, according to ASTM D1003. The article, having a 3.2 mm thickness, may exhibit a light transmission value of greater than or equal to 50%, greater than or equal to 55%, greater than or equal to 60%, greater than or equal to 65%, greater than or equal to 70%, greater than or equal to 75%, greater than or equal to 80%, greater than or equal to 81%, greater than or equal to 82%, greater than or equal to 83%, greater than or equal to 84%, greater than or equal to 85%, greater than or equal to 86%, greater than or equal to 87%, greater than or equal to 88%, greater than or equal to 89%, greater than or equal to 90%, greater than or equal to 95%, or greater than or equal to 99%, according to ASTM D1003. The article, having a 3.2 mm thickness, may exhibit a light transmission value of 50%, 55%, 60%, 65%, 70%, 75%, 80%, 81%, 82%, 83%, 84%, 85%, 86%, 87%, 88%, 89%, 90%, 95, or 99%, according to ASTM D1003.

The article may have a haze value of equal to or less than 20%, equal to or less than 15%, equal to or less than 10%, equal to or less than 5%, equal to or less than 4%, equal to or less than 3%, equal to or less than 2%, equal to or less than 1%, or equal to or less than 0.5%, as measured using 3.2 mm thick plaques according to ASTM D1003.

Heat deformation temperature or heat deflection temperature (HDT) is the temperature at which a polymer sample deforms under a specified load. For example, the HDT at 1.82 MPa or 0.45 MPa may be measured on 3.2 mm×126 mm×13 mm test bars, formed from the thermoplastic resin, according ASTM D648. At 0.45 MPa, the HDT of the article may be from 100° C. to 150° C., from 115° C. to 145° C., from 120° C. to 140° C., or from 125° C. to 135° C. At 0.45 MPa, the HDT of the article may be 110° C., 111° C., 112° C., 113° C., 114° C., 115° C., 116° C., 117° C., 118° C., 119° C., 120° C., 130° C., 135° C., 136° C., 137° C., 138° C., 139° C., or 140° C. At 1.82 MPa, the HDT of the article may be from 90° C. to 130° C., from 100° C. to 125° C., from 105° C. to 120° C., or from 110° C. to 115° C. At 1.82 MPa, the HDT of the article may be 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., or 126° C.

Notched izod measurements, in accordance with ASTM D256, may be conducted on test bars at any temperature, for example 23° C. The test bars may measure 0.125 inches in thickness by 0.5 inches wide by 2.5 inches long. The test bar may be formed from the thermoplastic resin described herein. The test bar may possess greater than 50% ductility at 23° C., greater than 60% ductility at 23° C., greater than 70% ductility at 23° C., greater than 80% ductility at 23° C., greater than 90% ductility at 23° C., greater than 95% ductility at 23° C., or greater than 99% ductility at 23° C. The test bar may possess 100% ductility at 23° C. according to ASTM D256. The test bar may have an impact strength of greater than 450 J/m², greater than 460 J/m², greater than 470 J/m², greater than 480 J/m², greater than 490 J/m², greater than 500 J/m², greater than 510 J/m², greater than 520 J/m², greater than 530 J/m², greater than 540 J/m², greater than 550 J/m², greater than 560 J/m², greater than 570 J/m², greater than 580 J/m², greater than 590 J/m², greater than 600 J/m², or greater than 610 J/m², measured at 23° C. according to ASTM D256.

The tensile elongation at ("@") break (%) imparted by a molding composition is generally at least 5%. In another embodiment, the tensile elongation @ break (%) ranges from 30% to 300%. In one embodiment, the tensile elongation @ break (%) ranges from 40% to 75%.

The tensile stress @ yield (MPa) may be measured according to ASTM D 638. The tensile stress may be measured at 0.2 inches per minute. The tensile stress @ yield (MPa) imparted by the thermoplastic composition is generally at least 50 MPa. The tensile stress @ yield (MPa) may range from 20 MPa to 100 Mpa or from 40 to 75 MPa. The tensile stress @ yield (MPa) may be 50, 51, 52, 53, 54, 55, 56, 57, 58, 59, or 60 MPa.

The tensile stress @ break (MPa) may be measured according to ASTM D 638. The tensile stress may be measured at 0.2 inches per minute. The tensile stress @ break (MPa) imparted by the thermoplastic composition is generally at least 50 MPa. The tensile stress @ break (MPa) may range from 20 MPa to 100 Mpa or from 40 to 75 MPa. The tensile stress @ break (MPa) may be 50, 51, 52, 53, 54, 55, 56, 57, 58, 59, or 60 MPa.

The tensile strain @ yield (%) may be measured according to ASTM D 638. The tensile strain may be measured at 0.2 inches per minute. The tensile strain @ yield (%) imparted by the thermoplastic composition is generally at least 3%. The tensile strain @ yield (%) may range from 1% to 7% or from 4% to 6%. The tensile strain @ yield (%) may be 4.5, 4.6, 4.7, 4.8, 4.9, 5.0, 5.1, 5.2, 5.3, 5.4, 5.5, 5.6, 5.7, 5.8, 5.9, 6.0, or 6.1%, for example.

The tensile strain @ break (%) may be measured according to ASTM D 638. The tensile strain may be measured at 0.2 inches per minute. The tensile strain @ break (%) imparted by the thermoplastic composition is generally at least 80%. The tensile strain @ break (%) may range from 70% to 110% or from 80% to 105%. The tensile strain @ break (%) may be 80, 81, 82, 83, 84, 85, 86, 87, 88, 89, 90, 91, 92, 93, 94, 95, 96, 97, 98, 99, 100, 101, 102, 103, 104, or 105%.

The tensile modulus may be measured according to ASTM D 638. The tensile modulus may be measured at 0.2 inches per minute. The tensile modulus imparted by the thermoplastic composition is generally at least 2200 MPa. The tensile modulus may range from 2000 to 2500 MPa or from 2200 to 2400 MPa. The tensile modulus may be 2320, 2330, 2340, 2350, 2360, 2370, 2380, 2390, 2400, or 2410 MPa.

The article may have a UL94 V0 flame rating at a thickness of from 0.2 mm to 2.5 mm. The article may have a UL94 V0 flame rating at a thickness of 0.2 mm, 0.3 mm, 0.4 mm, 0.5 mm, 0.6 mm, 0.7 mm, 0.8 mm, 0.9 mm, 1.0 mm, 1.5 mm, 2.0 mm, or 2.5 mm, for example.

The articles molded from the polycarbonate resin composition may have a yellowing index (YI) of 4 or less (at a 3.2 mm thickness), 3 or less (at a 3.2 mm thickness), or 2 or less (at a 3.2 mm thickness). Resistance to heat discoloration may be evaluated by a difference between the YI value of a control article, such as an article subjected to regular conditions, and the YI value of a test article that is subjected to abusive conditions. The smaller the difference between a YI value of the test article and a YI value of the control article is, the more highly resistance to heat discoloration is evaluated. Yellowness index (YI) may be determined according to ASTM D1925-70.

Abusive conditions may include subjecting the polycarbonate resin and/or article derived from the resin to increased temperatures for a period of time. The abusive conditions may reflect temperatures associated with molding and/or extruding processes. For example, abusive conditions may include subjecting the polycarbonate resin or article to a temperature of greater than 300° C., of greater than 325° C., or of greater than 350° C. The polycarbonate resin or article may be subjected to the increased temperature for a period of time greater than 1 minute, greater than 2 minutes, greater than 3 minutes, greater than 4 minutes, greater than 5 minutes, greater than 6 minutes, greater than 7 minutes, greater than 8 minutes, greater than 9 minutes, greater than 10 minutes, greater than 15 minutes, greater than 20 minutes, greater than 25 minutes, greater than 30 minutes, greater than 35 minutes, greater than 40 minutes, greater than 50 minutes, or greater than 60 minutes.

Regular conditions may include subjecting the polycarbonate resin and/or article derived from the resin to temperatures less than those determined to be abusive temperatures for a period of time.

The articles molded from the polycarbonate resin composition may have a molecular weight retention of 95% or greater, or 96% or greater after exposure to 85° C. at 85% relative humidity (RH) for a period of 4 weeks. The articles molded from the polycarbonate resin composition may have a molecular weight retention of 92% or greater, or 93% or greater after exposure to 85° C. at 85% relative humidity (RH) for a period of 8 weeks.

a. Thin Wall

The article may be a thin wall article. The thin wall article may be a sheet-like article formed from the thermoplastic resin. The thin wall article may have a thickness of less than 0.75 mm, less than 0.70 mm, less than 0.65 mm, less than 0.60 mm, less than 0.55 mm, less than 0.50 mm, less than 0.45 mm, less than 0.40 mm, less than 0.35 mm, less than 0.30 mm, less than 0.25 mm, less than 0.20 mm, less than 0.15 mm, or less than 0.10 mm. A portion of the article may have a thickness of less than 0.75 mm, less than 0.70 mm, less than 0.65 mm, less than 0.60 mm, less than 0.55 mm, less than 0.50 mm, less than 0.45 mm, less than 0.40 mm, less than 0.35 mm, less than 0.30 mm, less than 0.25 mm, less than 0.20 mm, less than 0.15 mm, or less than 0.10 mm.

The thin wall article may be a touch pad or screen, for example. The touch pad or screen may be a sheet molded from the thermoplastic composition. The touch pad or screen may comprise a cover, which may be a sheet molded from the thermoplastic composition. The touch pad may comprise variously arranged elements as described in EP 1973 028, which is hereby incorporated by reference in its entirety. The touch pad, screen, or cover may be used in connection with a smartphone, a personal digital assistant, a tablet computer, a hand-held video game device, or the like, for example.

The touch pad may have a touch-sensitive surface, sensor or set of sensors that accepts input from the user based on haptic and/or tactile contact. The touch screen may detect contact (and any movement or breaking of the contact) on the touch screen and convert the detected contact into interaction with user-interface objects such as one or more soft keys, icons, web pages, or images that are displayed on the touch screen. A point of contact between a touch screen and the user may correspond to a finger of the user.

When the touch pad or screen or cover is touched, the touch may be converted into a signal, such as an electrical signal, which may be identified by various sensors that are installed in such phones. A touch driver on the screen, pad, or cover may identify the touch similarly to the cursor of a desktop mouse (e.g., the touch driver may be like a computer mouse).

There may be one or more layers under the touch screen, pad, or cover. For example, an upper layer made of polyester and a lower layer made of glass. When the screen, pad, or cover is touched, the polyester is touched and it completes a circuit, thereby sending corresponding signals. An integrated chip in such screens may aid in a device's determination of the specific area on the screen being touched. Alternatively, ultrasonic sound beams may be used, whereby ultrasound frequency is generated from the edges of the screen, pad, or cover. When the screen, pad, or cover is touched, the sound may be interrupted and a signal is generated.

Near field imaging (NFI) may be used in conjunction with the touch screen, pad, or cover. NFI employs the principle of electromagnetic interference. NFI may respond to changes in the electrical field of the screen, pad, or cover. When a finger is close to the screen, pad, or cover, the electric field changes and so it registers a touch.

The touch pad may use liquid crystal display (LCD) technology, or light emitting polymer display (LPD) technology, for example. A touch sensitive display of the touch pad may be as described in U.S. Pat. Nos. 8,171,432; 6,323,846; 6,570,557; and 6,677,932, each of which is hereby incorporated by reference in its entirety.

The touch pad may comprise a circuit board comprising touch sensors and illuminating elements to illuminate the function icons on the cover. The touch sensors and illuminating elements may be mounted at positions on the circuit board corresponding to a plurality of function icons. The touch pad may have a cover frame, mounted between the cover and the circuit board, for supporting the cover. The circuit board may be connected to the cover frame, wherein the cover frame comprises a plurality of light guide hollows for guiding light from the illuminating elements to the function icons. The light guide hollows may have a funnel shape in which a diameter of each of the light guide hollows increases away from the illuminating elements.

b. Protective Articles

The impact properties of the thermoplastic composition and articles formed therefrom make them desirable as protective compositions/articles/housings that impart various levels of impact and scratch resistance to computer and business machines such as monitors; handheld electronic devices, such as cell phones, smartphones, personal digital assistants, tablet computers, hand-held video game devices, or the like; electrical connectors; and components of lighting fixtures, ornaments, home appliances, roofs, greenhouses, sun rooms, swimming pool enclosures, electronic device casings, and the like, in addition to those listed above. The protective article may be a thin wall article as described above. The protective article may snap onto a handheld electronic device, such as a tablet, cell phone, smartphone, personal digital assistant, hand-held video game devices, or the like.

6. Mixers and Extruders

Compositions comprising the thermoplastic composition can be manufactured by various methods. For example, the poly(aliphatic ester)-polycarbonate copolymer and heat stabilizer and epoxy and redistribution catalyst may be first blended in a high speed HENSCHEL-Mixer®. Other low shear processes, including but not limited to hand mixing, can also accomplish this blending. The blend may then be fed into the throat of a single or twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming The present invention can be utilized as illustrated by the following non-limiting examples.

EXAMPLE 1

General Sebacic Acid Copolyestercarbonate Resin Synthesis Description

Bisphenol-A and sebacic acid are weighed, then transferred to a formulation tank which contains methylene chloride, water, triethyamine (catalyst) and a small amount of aqueous sodium hydroxide. The mixture is agitated for 5 minutes and then transferred to the polymerization reactor. Phosgene is added to the reaction mixture over the course of 25 minutes. P-cumylphenol is added to the polymerization reactor over the course of five minutes during the phosgenation. Aqueous sodium hydroxide is additionally added in order to control reaction pH.

Alternatively, sebacic acid is dissolved in a mixture of water and aqueous sodium hydroxide. Bisphenol-A is weighed, then transferred to a formulation tank which contains methylene chloride, water and triethylamine (catalyst). The formulation mixture is transferred to the polymerization reactor. The sebacic acid solution is transferred to the polymerization reactor. Phosgene is added to the reaction mixture over the course of 25 minutes. P-cumylphenol is added to the reactor over the course of five minutes during the phosgenation. Aqueous sodium hydroxide is additionally added in order to control reaction pH.

After completion of the polymerization, the reaction mixture is discharged to the centrifuge feed tank. The polymer solution is purified by feeding the reaction product to a train of liquid/liquid centrifuges. The first centrifuge stage separates the reaction by product brine from the resin solution. The second centrifuge stage removes catalyst from the resin solution by washing with dilute aqueous hydrochloric acid. The third centrifuge stage removes residual ionic species by washing the resin solution with water.

The purified resin solution is then concentrated by evaporation of methylene chloride. The resin is then precipitated by co-feeding the resin solution to a jet with steam to flash off the methylene chloride. Residual methylene chloride is removed from the resin by counter current contact with steam. Excess water is removed from the resin using heated air in a fluidizing dryer.

EXAMPLE 2

Specific Sebacic Acid Copolyestercarbonate Resin Synthesis Process Description

In a Nalgene plastic container was placed sebacic acid (325 g, 1.6 moles), 50% NaOH (280 g, 3.5 moles), and water (2500 mL) (referred to as the "sebacic acid solution"). The mixture was placed on a platform shaker and mixed until dissolved. To a formulation tank was added dichloromethane (10 L), deionized water (10 L), bisphenol-A (4175 g, 18.3 moles), the sebacic acid solution, para-cumyl phenol (135 g, 0.64 moles), triethylamine (50 g, 0.49 moles, 2.5 mol %), and sodium gluconate (10 g). The mixture was stirred and transferred to a batch reactor. The reactor agitator was started and the circulation flow was set at 80 L/min. Phosgene vapor flow to the reactor was initiated by the distributed control system (DCS) in three continuous segments separated by different pH targets. Reaction pH was controlled by DCS addition of 50% aqueous NaOH. During segment 1 (50% of total phosgene charge, 1295 g, 13.1 moles) the reaction pH target was 7.25. During segment 2 (phosgene charge 320 g, 3.2 moles) the reaction pH target was ramped from 7.25 to 10.2. Segment 3 (phosgene 965 g, 9.7 moles) maintained a pH target of 10.2 until the total phosgene setpoint was reached (2580 g, 26.0 moles). A sample of the reactor was obtained and verified to be free of unreacted BPA and free of chloroformate. Mw of the reaction sample was determined by GPC (Mw 27188, PDI=2.7). The reactor was purged with nitrogen and the batch was transferred to centrifuges for HCl/water wash and isolation via steam precipitation, as described above.

Charge for C914090 (36,500 Mw, 8.25 mol % sebacic acid): Sebacic acid=333 g, 1.64 moles; BPA=4165 g, 18.26 moles; para-cumyl phenol ("PCP")=88 g, 0.42 moles; and MVR was 6 cm$^3$/10 min.

Charge for C914089 (21,500 Mw, 6.0 mol % sebacic acid): Sebacic acid=242 g, 1.19 moles; BPA=4268 g, 18.71 moles; PCP=163 g, 0.77 moles; and MVR was 40 cm$^3$/10 min.

EXAMPLE 3

Low Molecular Weight Poly(Aliphatic Ester)-Polycarbonate Copolymer and Manufacture A low molecular weight (Mw~17,000) poly(aliphatic ester)-polycarbonate copolymer "HFD-100" (high flow ductile-100 g/10 minutes melt flow rate at 300° C. under 1.2 kgf) was prepared using reactive chain-chopping chemistry with a redistribution catalyst during extrusion. An HFD copolymer (labeled "C914089"), having a molecular weight of 21,500 and 6.0 mol % sebacic acid, was mixed with an epoxy (Joncryl), a mold release agent (PETS), and a heat stabilizer (Irgaphos). This mixture was subjected to reactive chain chopping extrusion with a redistribution catalyst. The mixture was added to a 30 mm co-rotating twin screw (Werner & Pfleiderer; ZSK-30) extruder using a melt temperature of 300° C. with a rate of 20 kgs/hr, 20 inches of mercury vacuum and a screw speed of 400 RPM. A redistribution catalyst (tetrabutyl phosphonium hydroxide, 45% solution in water) was fed into the extruder using a separate liquid pump feeder. The extrudate was cooled under water and pelletized and dried at 120° C. for 4 hours with a desiccant bed dryer. The resultant product was labeled "HFD-100."

Tables 1 and 2 provide descriptions of the resins and raw materials used in the formulations for the high flow ductile thermoplastic resins. Table 3 shows formulations for exemplary high flow ductile thermoplastic resins HFD-40, HFD-55, and HFD-100, as well as for standard polycarbonates PC-65 and PC-100. "HFD-40" refers to a high flow ductile thermoplastic resin having a 40 g/10 minutes melt flow rate at 300° C. under 1.2 kgf; "HFD-55" refers to a high flow ductile thermoplastic resin having a 55 g/10 minutes melt flow rate at 300° C. under 1.2 kgf; "HFD-100" refers to a high flow ductile thermoplastic resin having a 100 g/10 minutes melt flow rate at 300° C. under 1.2 kgf; "PC-65" refers to a standard polycarbonate having a 65 g/10 minutes melt flow rate at 300° C. under 1.2 kgf; and "PC-100" refers to a standard polycarbonate having a 100 g/10 minutes melt flow rate at 300° C. under 1.2 kgf.

TABLE 1

| Resin | Description | ASTM D6866 Bio-Content | Mw (GPC) | PDI (GPC) |
| --- | --- | --- | --- | --- |
| C914089 | 6 mol % sebacic acid polycarbonate copolymer | 5.0% | 21,500 | 2.6 |
| C914090 | 8.25 mol % sebacic acid polycarbonate copolymer | 6.0% | 36,000 | 2.7 |
| C017 | Bisphenol-A polycarbonate | 0.0% | 21,900 | 2.5 |
| CPCFOQ | Bisphenol-A polycarbonate | 0.0% | 17,900 | 2.4 |
| CPCFOQ1 | Bisphenol-A polycarbonate | 0.0% | 15,000 | 2.4 |

TABLE 2

| Material | Description | Manufacturer |
| --- | --- | --- |
| C914089 | Lo Mw (sebacic acid copolymer) | SABIC-IP |
| C914090 | Hi Mw (sebacic acid copolymer) | SABIC-IP |
| C017 | Hi Flow PC (BPA-Polycarbonate) | SABIC-IP |
| CPCFOQ | OQ PC (BPA-Polycarbonate) | SABIC-IP |
| CPCFOQ1 | OQ PC (BPA-Polycarbonate) | SABIC-IP |
| F542 | Irgaphos | Ciba Specialty Chemicals |
| F538 | Pentaerythritol tetrastearate (PETS) | Lonza, Inc. |
| F722236 | Joncryl ADR 4368CS | BASF |
| F362 | Tetrabutylphosphonium hydroxide, 40 wt % aqueous solution | Sigma Aldrich |

TABLE 3

| Material | Description | PC-65 pph | PC-100 pph | HFD-40 pph | HFD-55 pph | HFD-100 pph |
| --- | --- | --- | --- | --- | --- | --- |
| C914089 | HFD Low Mw Copolymer | 0 | 0 | 95 | 50 | 100 |
| C914090 | HFD High Mw Copolymer | 0 | 0 | 5 | 0 | 0 |
| CPCFOQ | Polycarbonate 17,000 Mw | 100 | 0 | 0 | 50 | 0 |
| CPCFOQ1 | Polycarbonate 15,000 Mw | 0 | 100 | 0 | 0 | 0 |
| F362 | Irgaphos | 0.06 | 0.06 | 0.06 | 0.06 | 0.06 |
| F538 | PETS | 0.20 | 0.20 | 0.20 | 0.20 | 0.20 |
| F722236 | Joncryl epoxy | 0.10 | 0.10 | 0.10 | 0.10 | 0.10 |
| F362 | Tetrabutyl phosphonium hydroxide, 40% solution in water | 0 | 0 | 0 | 0 | 0.029 |

Test specimens were made by injection molding the dried pellets using a Van Dorn 80T molding machine at 300° C. melt temperature to form test parts for impact and mechanical testing. Physical and mechanical properties of the test materials in this study were measured using ASTM and ISO test standards. Light transmission and haze were measured in accordance with ASTM D 1033 using a Gardner Haze Gard instrument. A comparison of physical and mechanical properties is shown in Table 4.

TABLE 4

| | PC-65 | PC-100 | HFD-40 | HFD-55 | HFD-100 Value | Unit | Standard |
| --- | --- | --- | --- | --- | --- | --- | --- |
| Mechanical | | | | | | | |
| Tensile Modulus, 0.2 in/min | 2390 | ** | 2270 | 2300 | 2340 | MPa | ASTM D 638 |

TABLE 4-continued

| | PC-65 | PC-100 | HFD-40 | HFD-55 | HFD-100 Value | Unit | Standard |
|---|---|---|---|---|---|---|---|
| Tensile Stress, yld, Type 1, 0.2 in/min | 59 | ** | 60 | 60 | 53 | MPa | ASTM D 638 |
| Tensile Stress, brk, Type 1, 0.2 in/min | 52 | ** | 56 | 57 | 52 | MPa | ASTM D 638 |
| Tensile Stress, yld, Type 1, 0.2 in/min | 5.5 | ** | 5.5 | 5.5 | 5.5 | % | ASTM D 638 |
| Tensile Stress, brk, Type 1, 0.2 in/min | 83 | ** | 130 | 114 | 101 | % | ASTM D 638 |
| Impact | | | | | | | |
| Izod impact, notched 23° C. | 500 | ** | 728 | 674 | 596 | J/m | ASTM D256 |
| Izod impact, notched 23° C. ductile (% ductility) | 20 | ** | 100 | 100 | 100 | % | ASTM D256 |
| Instrumented impact Energy @ peak, 23° C. | 34 | ** | 56 | 56 | 62 | J | ASTM D 3763 |
| Instrumented impact % ductile 23° C. | 60 | ** | 100 | 100 | 100 | % | ASTM D256 |
| Physical | | | | | | | |
| Specific Gravity | 1.20 | 1.20 | 1.2 | 1.2 | 1.20 | — | ASTM D 792 |
| Melt Flow Rate, 300° C., 1.2 kgf | 65 | 100 | 40 | 55 | 100 | g/10 min | ASTM D 1238 |
| Melt Flow Rate, 250° C., 1.2 kgf | 11 | 19 | 8.0 | 9.5 | 19 | g/10 min | ASTM D 1238 |
| Thermal | | | | | | | |
| HDT, 0.45 MPa, 3.2 mm, unannealed | 135 | ** | 121 | 124 | 117 | ° C. | ASTM D 648 |
| HDT, 1.82 MPa, 3.2 mm, unannealed | 124 | ** | 110 | 110 | 103 | ° C. | ASTM D 648 |
| Optial | | | | | | | |
| Light Transmission, 3.2 mm thickness | 89 | ** | 89 | 89 | 89 | % | ASTM D1003 |
| % Haze, 3.2 mm thickness | <1 | ** | <1 | <1 | <1 | % | ASTM D1003 |

"**" refers to a material that was too brittle and could not be molded into proper test bars without cracking/shattering.

As shown in Table 4, the HFD-100 shows superior impact properties as compared to the standard polycarbonates PC-65 and PC-100. Further, the very high melt flow (100 g/10 min at 300° C., 1.2 kg), high optical light transmission and clarity, low color, and 100% ductility at room temperature (notched izod and multi-axial impact) enable the production of very thin wall and protective articles for use as touch screens/pads and/or protective housings, for example. The HFD-100 can be molded into a wall thickness of less than 0.5 mm. Molding plaques were manufactured at 0.3 mm thickness, for example.

These thicknesses were also generated for a snap-on protective housing for a phone, the protective housing configured to protect the back and sides of the phone, and having dimensions of 114 mm length×66 mm×8 mm depth. The protective housing had a thickness in some parts of ≤0.5 mm (e.g., the back, the sides). The articles (e.g., touch pads, protective housings) can be manufactured having thicknesses of less than or equal to 0.5 mm (e.g., 0.5 mm, 0.4 mm, 0.3 mm, 0.25 mm), wherein the thickness of less than or equal to 0.5 mm may be a thickness of the front, back, and/or one or more sides of the article.

Low molecular weight poly(aliphatic ester)-polycarbonate copolymer polycarbonates with melt flow rates of 150 g/10 min at 300° C., 1.2 kgf were found to be very brittle in Instrumented Impact Testing, and may not be suitable for Protective Housings.

Color plaques of 3.2 mm thickness were molded at standard (550° F. melt temperature and 30 sec cycle time) and abusive molding conditions (550° F. melt temperature and 10 minutes dwell time) to check the color performance of the formulations expressed as Yellowness Index. Yellowness Index (YI) is a number calculated from spectrophotometric data and is commonly used to evaluate color changes in a material from clear or white toward yellow. Table 5 shows a comparison of HFD-100, HFD-40, and PC-65 before and after the 10 min dwell test at 550° F.

TABLE 5

| Yellowness Index | PC-65 | HFD-40 | HFD-100 |
|---|---|---|---|
| standard | 1.56 | 2.08 | 1.77 |
| 10 min dwell | 1.72 | 2.26 | 1.88 |

As shown in Table 5, HFD-100 does surprising better than HFD-40 (6% YI change for HFD-100 versus 8% YI change for HDF-40) and only slightly worse than PC-65 (which actually has a 9% change but started out at a lower value).

The color performance results indicate that HFD-100 is suitable for use in articles, such as for example, cell phones and touchpads.

A hydrolytic stability study was performed at 85° C. at 85% relative humidity (RH). The molecular weight of the samples was measured at 4 weeks and 8 weeks. 4 weeks corresponds to approximately 5 years of shelf life at room temperature. The molecular weight retention is shown in Table 6.

TABLE 6

| % MW Retention | PC-25 | PC-65 | HFD-40 | HFD-100 |
|---|---|---|---|---|
| 4 weeks | 98.12 | 97.68 | 96.41 | 96.63 |
| 8 weeks | 96.84 | 94.94 | 93.01 | 92.57 |

As illustrated in Table 6, HFD-100 shows comparable stability to HFD-40 and slightly lower molecular weight retention than the PC-25 and PC-65, but still acceptable since the hydrolytic stability test is a predictor of long term performance.

EXAMPLE 4

Injection-Moldable Front Cover for a Mobile Device or Touch Pad

Polycarbonate thermoplastic resin plaques of varying thicknesses were prepared and placed flush over the front touch-screen display of a smartphone device. Tests were conducted to determine whether the touch-screen function worked through the plaques (e.g., ability to navigate between icons, open applications "Apps" from an icon, scroll through pages, etc.). Table 7 shows that plaque cover thicknesses of 0.3 mm and 0.5 mm had no negative impact on the touch-screen performance, and allowed full function of the touch-screen display. A 0.8 mm plaque cover required multiple taps or "hard" taps to activate icons on the touch-screen. A 1.5 mm plaque cover did not allow for touch screen performance (e.g., unable to scroll or open icons). Table 7 shows that the thermoplastic compositions disclosed herein can be used as covers and protective covers for touch-screen displays, particularly at cover thicknesses of 0.1 mm to 1 mm, preferably 0.2 mm to 0.8 mm, more preferably 0.3 mm to 0.5 mm.

TABLE 7

| Tested Device | Thermoplastic Cover Thickness | Result |
|---|---|---|
| Touch-Screen Display | 0.3 mm | Full function, no negative impact on touch-screen performance |
| Touch-Screen Display | 0.5 mm | Full function, no negative impact on touch-screen performance |
| Touch-Screen Display | 0.8 mm | Reduced function, requires multiple taps or "hard" taps to activate icons |
| Touch-Screen Display | 1.5 mm | No function--unable to scroll or open icons |

Full function = no negative impact on touch-screen performance
Reduced function = requires multiple taps or "hard" taps to activate icons
No function = unable to scroll or open icons While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

We claim:

1. A device comprising:
   a touch screen display having functional icons; and
   a protective cover comprising a sheet molded from a thermoplastic composition, the sheet having a thickness of 0.5 mm or less and a surface area of at least 150 mm$^2$, the thermoplastic composition comprising
   (a) a poly(aliphatic ester)-polycarbonate copolymer comprising soft block ester units and carbonate units;
   (b) a heat stabilizer; and
   (c) an epoxy resin,
   wherein the thermoplastic composition has a melt flow rate ranging from 40 g/10 minutes to 150 g/10 minutes, measured according to ASTM D1238 at 300° C. and 1.2 kilogram-force;
   wherein the protective cover is placed over the touch screen display.

2. The device of claim 1, wherein the sheet has a thickness of 0.3 mm or less.

3. The device of claim 1, wherein the sheet has a thickness of 0.25 mm or less.

4. The device of claim 1, wherein the protective cover has a light transmission of greater than or equal to 89% and less than 1% haze at 3.2 mm thickness according to ASTM D 1003.

5. The device of claim 1, wherein the device is a smartphone, personal digital assistant, tablet computer, or handheld video game device.

6. The device of claim 1, further comprising a circuit board comprising touch sensors and illuminating elements to illuminate the function icons on the touch screen display, the touch sensors and illuminating elements being respectively mounted at positions on the circuit board corresponding to the plurality of function icons.

7. The device of claim 6, further comprising a cover frame, mounted from the touch screen display and the circuit board, for supporting the touch screen display, the circuit board connected to the cover frame, wherein the cover frame comprises a plurality of light guide hollows for guiding light from the illuminating elements to the function icons, the light guide hollows having a funnel shape in which a diameter of each of the light guide hollows increases away from the illuminating elements.

8. The device of any one of claim 1, 2-4, or 5-7, wherein an ASTM part molded from the thermoplastic composition exhibits 100% ductility at 23° C.

9. The device of any one of claim 1, 2-4, or 5-7, wherein the thermoplastic composition exhibits a melt flow rate of below 150 g/10 minutes at 300° C. under a load of 1.2 kg according to ASTM D 1238.

10. The device of any one of claim 1, 2-4, or 5-7, wherein the thermoplastic composition exhibits a melt flow rate of 100 g/10 minutes at 300° C. under a load of 1.2 kg according to ASTM D 1238.

11. The device of any one of claim 1, 2-4, or 5-7, wherein the thermoplastic composition exhibits a melt flow rate of 40 g/10 min at 300° C. under a load of 1.2 kg according to ASTM D 1238.

12. The device of any one of claim 1, 2-4, or 5-7, wherein the thermoplastic composition exhibits a melt flow rate of 55 g/10 min at 300° C. under a load of 1.2 kg according to ASTM D 1238.

13. The device of claim 12, wherein the thermoplastic composition further comprises a low molecular weight bisphenol-A polycarbonate having a molecular weight of 17,000 g/mol, as measured by gel permeation chromatography (GPC) using bisphenol-A polycarbonate standards.

14. The device of any one of claim 1, 2-4, or 5-7, wherein the soft block ester units of the poly(aliphatic ester)-polycarbonate are derived from an alpha, omega $C_{6\text{-}20}$ aliphatic dicarboxylic acid or a derivative thereof.

15. The device of claim 14, wherein the alpha, omega $C_{6\text{-}20}$ aliphatic dicarboxylic acid is an alpha, omega $C_{10}$ dicarboxylic acid.

16. The device of claim 15, wherein the $C_{10}$ dicarboxylic acid is sebacic acid.

17. The device of any one of claim 1, 2-4, or 5-7, wherein the poly(aliphatic ester)-polycarbonate copolymer comprising soft block ester units and carbonate units has the following formula:

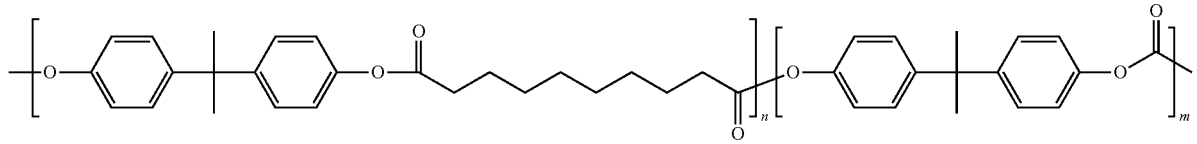

wherein n is from 1 to 6; and m is from 25 to 60.

18. The device of any one of claim 1, 2-4, or 5-7, wherein the poly(aliphatic ester)-polycarbonate copolymer contains 6.0 mol % sebacic acid.

19. The device of any one of claim 1, 2-4, or 5-7, wherein the heat stabilizer is:

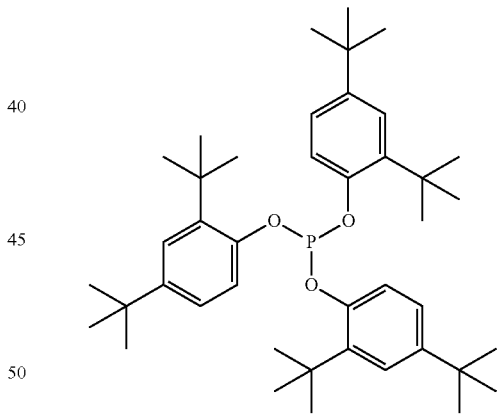

tris(2,4-di-t-butylphenyl)phosphite;

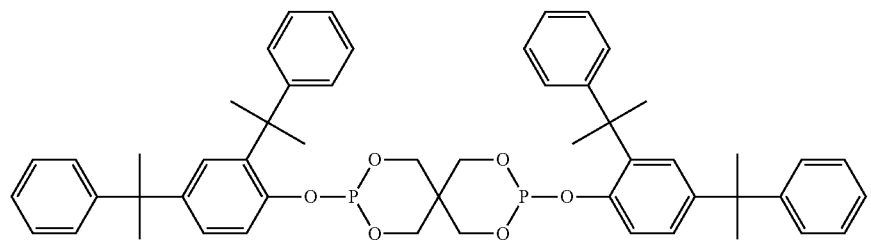 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

bis(2,4-dicumylphenyl)pentaerythritol diphosphite; or a combination thereof.

20. The device of any one of claim 1, 2-4, or 5-7, wherein the epoxy resin is a hydrolytic stabilizer.

21. The device of any one of claim 1, 2-4, or 5-7, wherein the epoxy resin has multiple epoxy groups.

22. The device of any one of claim 1, 2-4, or 5-7, wherein the epoxy resin is Joncryl ADR-4368CS.

23. The device of any one of claim 1, 2-4, or 5-7, wherein the thermoplastic composition further comprises a mold release agent.

24. The device of claim 23, wherein the mold release agent is pentaerythritol tetrastearate (PETS), a phthalic acid ester, or a poly-alpha-olefin.

25. The device of claim 24, wherein the mold release agent is pentaerythritol tetrastearate (PETS).

26. The device of any one of claim 1, 2-4, or 5-7, wherein a 3.2 mm thick plaque molded from the thermoplastic composition, molded at 550° F. melt temperature and 10 minutes dwell time, exhibits a Yellowing Index (YI) value of less than 2.00.

27. The device of any one of claim 1, 2-4, or 5-7, wherein a 3.2 mm thick plaque molded from the thermoplastic composition, molded at 550° F. melt temperature and 10 minutes dwell time, exhibits a Yellowing Index (YI) percent increase of 6% or less compared to a 3.2 mm thick plaque molded from the thermoplastic composition at 550° F. melt temperature and 30 seconds dwell time.

28. The device of any one of claim 1, 2-4, or 5-7, wherein a 3.2 mm thick plaque molded from the thermoplastic composition exhibits a 96% or greater molecular weight retention after exposure to 85° C. at 85% relative humidity (RH) after 4 weeks.

29. The device of any one of claim 1, 2-4, or 5-7, wherein the thermoplastic composition is produced by a process comprising use of a redistribution catalyst that is 45% tetra-n-butyl phosphonium hydroxide solution in water.

* * * * *